United States Patent
Yoo

(10) Patent No.: US 7,170,888 B2
(45) Date of Patent: Jan. 30, 2007

(54) CALL CONTROL METHOD BETWEEN A PACKET NETWORK AND PSTNS IN THE NEXT GENERATION NETWORK

(75) Inventor: Jae En Yoo, Anyang-shi (KR)

(73) Assignee: LG-Nortel Co., Ltd., Seoul (KR)

( * ) Notice: Subject to any disclaimer, the term of this patent is extended or adjusted under 35 U.S.C. 154(b) by 1035 days.

(21) Appl. No.: 10/167,440

(22) Filed: Jun. 13, 2002

(65) Prior Publication Data

US 2003/0099227 A1 May 29, 2003

(30) Foreign Application Priority Data

Nov. 24, 2001 (KR) ................ 2001-73632

(51) Int. Cl.
- H04L 12/66 (2006.01)
- H04L 12/56 (2006.01)
- H04L 12/50 (2006.01)
- H04L 12/28 (2006.01)

(52) U.S. Cl. ............... 370/352; 370/401; 370/410

(58) Field of Classification Search ........ 370/248, 370/352, 356, 395.2, 395.21, 410, 353, 354, 370/355, 357, 389, 400, 401, 395.31

See application file for complete search history.

(56) References Cited

U.S. PATENT DOCUMENTS

| | | | |
|---|---|---|---|
| 6,674,759 B1* | 1/2004 | Christie et al. | 370/410 |
| 7,054,273 B1* | 5/2006 | Scholtens et al. | 370/248 |
| 2001/0002191 A1* | 5/2001 | Kim | 370/244 |
| 2004/0151178 A1* | 8/2004 | Hoffmann | 370/389 |
| 2005/0036517 A1* | 2/2005 | Larmala et al. | 370/502 |

* cited by examiner

Primary Examiner—Ricky Q. Ngo
Assistant Examiner—Feben Micael Haile
(74) Attorney, Agent, or Firm—Fleshner & Kim, LLP

(57) ABSTRACT

The present invention relates to a call control method between a packet network and Public Switched Telephone Networks (PSTNs) in the next generation network, which enables a terminating media gateway controller to conduct the virtual Continuity (COT) check in processing ISDN User Part (ISUP) calls for the inter-operation of the packet network and the PSTNs. In particular, according to the present invention, for the inter-operation of a packet network and PSTNs, the terminating media gateway controller seizes the trunk at the time when it receives an IAM from an originating media gateway controller and transits the IAM to a terminating PSTN. At this time, the Continuity Check Indicator (CCI) code of Nature of Connection Indicators (NCI) parameter within the IAM is set as 'Continuity Check Performed on a Previous Circuit.' When the bearer connection set-up is completed, the Continuity Indicator (CI) code of CI parameter within the COT message is set as 'Continuity Check Successful,' and then the COT message is transmitted to the terminating PSTN. Thus, the terminating subscriber is seized at the time when the packet network's bearer set-up has been completed. Consequently, the packet network's bearer set-up completion may be ensured. Also, by sending the IAM message at the same time as reserving the trunk between the packet network and the PSTN, to seize the trunk, the present invention may prevent the double seizure of the trunk between the packet network and the PSTN.

13 Claims, 6 Drawing Sheets

| Parameter | Reference (subclause) | Type | Length (Octets) |
|---|---|---|---|
| Message Type | 2.1 | F | 1 |
| Continuity Indicators(CI) | 3.18 | F | 1 |

COT Message

CI Parameter

CALL CONTROL METHOD BETWEEN A PACKET NETWORK AND PSTNS IN THE NEXT GENERATION NETWORK

BACKGROUND OF THE INVENTION

1. Field of the Invention

The present invention relates to a call control method between a packet network and public switched telephone networks (PSTNs) in the next generation network and more particularly to a method, for networking between a packet network and PSTNs in the next generation network, which may enable a terminating media gateway controller to conduct the virtual continuity (COT) check when processing ISDN user part (ISUP) calls.

2. Background of the Related Art

As illustrated in FIG. 1, the next generation network in the related art comprises a packet network (10), media gateways (21, 22), media gateway controllers (31, 32), signalling gateways (41, 42), and PSTNs (51, 52).

In the next generation network described above, the packet network (10) and the PSINs (51, 52) may be interfaced by the media gateways (21, 22) and the media gateway controllers (31, 32). There are various types of the media gateways (21, 22) corresponding to the types of media and the media gateways (21, 22) are operated by the control of the media gateway controllers (31, 32).

In order to control the packet network (10) consistently without regard to types of the bearer for voice or other data, the call control signalling and the bearer control signalling for voice or other data control must be distinguished.

In other words, if a call is made from the originating PSTN (51) to the terminating PSTN (52), the call control signalling is transferred from the originating PSTN (51) to the originating signalling gateway (41), to the originating media gateway controller (31), to the terminating media gateway controller (32), to the terminating signalling gateway (42), and then to the terminating PSTN (52), while the bearer control signalling for voice or data is transmitted from the originating PSTN (51) to the originating media gateway (21), to the packet network (10), to the terminating media gateway (22) and then to the terminating PSTN (52).

The call control protocol between the media gateway controllers (31, 32) is Bearer Independent Call Control (BICC) protocol or Session Initiation Protocol-Telephone (SIP-T) protocol, or the like. The call control protocol between the packet network (10) and the PSTNs (51, 52) (i.e., the call control protocol between the media gateway controllers (31, 32) and the PSTNs (51, 52)) is ISUP protocol. For the convenience of illustration, the call control protocol between the media gateway controllers (31, 32) will be assumed to be BICC protocol in the following.

The call control signalling between the originating PSTN (51) and the terminating PSTN (52) is conducted as follows.

First, the originating PSTN (51), using the ISUP signaling, makes the call requested by an originating subscriber transmitted through the originating signalling gateway (41) to the originating media gateway controller (31) which controls the originating signalling gateway (41), in order to make the call go through the packet network (10).

Then, the originating media gateway controller (31) translates a called number and searches for and finds the corresponding terminating media gateway controller (32). BICC, SIP-T, or the like may be used for the signalling between the originating media gateway controller (31) and the terminating media gateway controller (32).

Through the number translation, the terminating media gateway controller (32) searches for and finds the terminating PSTN (52). For the processing of the call to the located terminating PSTN (52), the call is transmitted through the terminating signalling gateway (42) to the terminating PSTN (52) by ISUP signaling.

On the other hand the bearer control signalling between the originating PSTN (51) and the terminating PSTN (52) is conducted as follows.

First, a bearer data of the originating PSTN (51) is transmitted to the originating media gateway (21) via a trunk. The originating media gateway (21) commences the signalling to send the bearer data to the packet network (10) according to the control of the originating media gateway controller (31).

Then, the terminating media gateway (22) receives the bearer control signalling from the packet network (10) according to the control of the terminating media gateway controller (32) and connects channels for the bearer connection. Also, the terminating media gateway (22) connects the trunk for the bearer connection to the terminating PSTN (52) upon receiving the control of the terminating media gateway controller (32).

Now, the call control inter-operation procedures between the packet network (10) and the PSTNs (51, 52) are explained with references to FIG. 2. There are two different kinds of call control procedures depending on the types of networks.

In the first kind of call control procedures, the originating media gateway controller (31) receives Initial Address Message (DIW, which is a call request message, from the originating PSTN (51) through the originating signalling gateway (41) so that the originating media gateway (21) may reserve the bearer information related to the call.

The originating media gateway controller (31) conducts the number translation of the DAM received through the originating signalling gateway and searches for and finds the corresponding terminating media gateway controller (32). Then, the originating media gateway controller (31) transmits the IAM to the located terminating media gateway controller (32).

The terminating media gateway controller (32), upon receiving the IAM from the originating media gateway controller (31), conducts the number translation of the called number, determines the trunk connecting the terminating media gateway (22) and the terminating PSTN (52), and notifies the terminating media gateway (22) of the trunk line reservation.

At this first time (the time indicated as 'T1' in FIG. 2) when the terminating media gateway controller (32) receives the IAM from the originating media gateway controller (31), the terminating media gateway controller (32) transmits the received IAM to the terminating PSTN (52) through the terminating signalling gateway (42).

The terminating media gateway controller (32) transmits the information concerning the terminating media gateway (22) and the bearer, contained in Application Transport Mechanism (APM) message, to the originating media gateway controller (31).

Then, the originating media gateway controller (31) sends a request for the bearer set-up to the originating media gateway (21), together with the information contained in the APM message received from the terminating media gateway controller (32).

The originating media gateway (21) conducts the bearer connection set-up by sending Bearer Set-up Request Message (BSRM) to the terminating media gateway (22). Thereafter, the originating media gateway (21) notifies the originating media gateway controller (31) of whether the bearer set-up is completed or not. The terminating media gateway (22) notifies the terminating media gateway controller (32) of the completion of the bearer connection set-up.

Thereafter, the call processing operation is conducted in the same manner as in the ordinary ISUP call processing.

On the other hand, in the second kind of call control procedures, as with the above-described operations, the terminating media gateway controller (32) notifies the terminating media gateway (22) of the trunk line reservation. Then, the information concerning the terminating media gateway (22) and the bearer, contained in an APM message, is transmitted to the originating media gateway controller (31).

Then, the originating media gateway controller (31) sends a request for the bearer set-up to the originating media gateway (21), together with the information contained in the APM message received from the terminating media gateway controller (32).

The originating media gateway (21) conducts the bearer connection set-up by sending a BSRM to the terminating media gateway (22). Thereafter, the originating media gateway (21) notifies the originating media gateway controller (31) of whether the bearer set-up is completed or not. The terminating media gateway (22) notifies the terminating media gateway controller (32) of the completion of the bearer connection set-up.

At this second time (the time indicated as 'T2' in FIG. 2) when the bearer connection set-up is completed, the terminating media gateway controller (32) transmits the IAM received from the originating media gateway controller (31) to the terminating PSTN (52) through the terminating signalling gateway (42).

Thereafter, the call processing operation is conducted in the same manner as in the ordinary ISUP call processing.

In both of the two kinds of the related art described above, there exist problems caused by the difference between the first time (T1) when the terminating media gateway controller (32) receives the IAM from the originating media gateway controller (31) and the second time (T2) when the bearer connection set-up is completed.

In the case of the first kind described above, because the initial IAM is transmitted to the terminating PSTN (52) while the packet network (10)'s bearer connection is not yet completed, a call request at the terminating end may be made to a terminating subscriber even when the bearer connection is not made. In other words, even if the terminating subscriber heard the ring or is holding the receiver, the subscribers may not hear any sound until the bearer is connected. Also, if the bearer connection fails in the packet network (10), the call may be terminated irregularly.

In the case of the second kind described above, because the initial IAM is transmitted at the time when the bearer connection is completed, the problem of the first kind may be avoided. However, when the terminating media gateway controller (32) receives the IAM from the originating media gateway controller (31), the trunk between the packet network (10) and the terminating PSTN (52) is merely reserved and the initial IAM is not sent until the bearer connection set-up is completed. Thus, there occurs a problem of dual seizure of the trunk. In other words, because the terminating PSTN (52) may not recognize trunks reserved in advance by the terminating media gateway controller (32), the call connection may frequently fail due to the dual seizure of the trunk.

As described above, in the call control method between the packet network and the PSTN in the next generation network in the related art, because the media gateway controller seizes the trunk between the media gateway and the PSTN and transmits the initial IAM while the bearer connection between the media gateways is not completed, the call request may be made to the terminating subscriber even without the bearer connection. Also, if the bearer connection fails in a core network such as the packet network after the call receiver heard the ring or held the receiver, the call may have to be terminated irregularly. Furthermore, in the case where the initial IAM is sent after the bearer connection set-up is completed, because the trunk between the media gateway and the PSTN is seized in advance at the time when the terminating media gateway controller receives an IAM from the originating media gateway controller and because the initial IAM is sent only after the bearer connection set-up is completed, the problem of dual seizure of the trunk may occur.

The above references are incorporated by reference herein where appropriate for appropriate teachings of additional or alternative details, features and/or technical background.

SUMMARY OF THE INVENTION

An object of the present invention is to solve at least the above problems and/or disadvantages and to provide at least the advantages described hereinafter.

It is another object of the present invention to ensure the bearer set-up completion in the packet network and to prevent the dual seizure of the trunk line between the packet network and the PSTN by checking the virtual COT in the ISUP call processing at the terminating media gateway controller for the interoperation between the packet network and the PSTN in the next generation network.

Furthermore, it is another object of the present invention to ensure the bearer set-up completion in the packet network by contacting the terminating subscriber at the time when the bearer set-up in the packet network is confirmed and to prevent the dual seizure of the trunk line between the packet network and the PSTN by sending the IAM simultaneously with reserving the trunk line, by conducting COT checking using the COP message included in ISUP message for the inter-operation between the packet network and the PSTN in the next generation network.

In order to achieve the above objects, a call control method between a packet network and PSTNs in the next generation network comprises the steps of: for the inter-operation between the packet network and the PSTN, setting up a virtual continuity (COT) check in the ISUP call processing and transmitting an IAM; and conducting the bearer connection set-up based upon the bearer set-up request of the packet network, including in COT message whether the COT check has been completed depending on the result of the bearer connection set-up and transmitting the COT message.

Preferably, the step of transmitting the IAM comprises the steps of: at an originating media gateway controller, receiving the IAM from an originating PSTN and reserving the relevant bearer information at an originating media gateway; at the originating media gateway controller, conducting the number translation of the IAM, searching for a terminating media gateway controller and transmitting the IAM to the terminating media gateway controller; at the terminating media gateway controller, receiving the IAM, conducting the number translation of the call receiving number, determining a terminating media gateway and a terminating PSTN at the same time as determining a trunk line and notifying the terminating media gateway of the reservation of the trunk line; and, at the terminating media gateway controller, after setting up the COT check in the IAM, transmitting the IAM with the COT check set-up to the terminating PSTN.

The step of sending the IAM with the COT check set-up comprises: at the terminating media gateway controller, setting up Continuity Check Indicator (CCI) code of Nature of Connection Indicators (NC) within the IAM received from the originating media gateway controller as 'Continuity Check Performed on a Previous Circuit'; at the terminating media gateway controller, transmitting the IAM with the COT check set-up to the terminating PSTN through a terminating signalling gateway; and, at the terminating PSTN, recognizing that the COT check is conducted and waiting for the COT check to be terminated without seizing the terminating subscriber.

Preferably, the step of transmitting the COT message comprises: at the terminating media gateway controller, including in Application Transport Mechanism (APM) message the information regarding the terminating media gateway and the bearer information and transmitting the APM message to the originating media gateway controller; at the originating media gateway controller, sending a request for the bearer set-up to the originating media gateway together with the information included in the APM message; at the originating media gateway, conducting the bearer connection set-up by transmitting the bearer set-up request message to the terminating media gateway and then notifying the originating media gateway controller of the result of the bearer connection set-up; at the terminating media gateway, confirming whether the bearer connection set-up has been completed and notifying the terminating media gateway controller of the confirmation result; and at the terminating media gateway controller, if the bearer connection set-up is completed, including in COT message the information that the COT check has been successfully completed and transmitting the COT message to the terminating PSTN.

The step of transmitting the COT message further comprises, at the terminating media gateway controller, if the bearer connection set-up fails, setting the CI code of Continuity Indicators (CI) parameter within the COT message as 'Continuity Check Failed' and transmitting the COT message to the termination PSTN.

Furthermore, the step of transmitting the COT message comprises: at the terminating media gateway controller, if the bearer connection set-up has been completed, setting the CI code of Continuity Indicators (CI) parameter within the COT message as 'Continuity Check Successful'; at the terminating media gateway controller, transmitting the COT message to the terminating PSTN through the terminating signalling gateway; and, at the terminating PSTN, recognizing that the COT check has been completed successfully and conducting the regular call processing by seizing the terminating subscriber and sending a ring.

Alternatively, in order to achieve the above objects, the call control method between a packet network and PSTNs in the next generation network according to another preferred embodiment of the present invention comprises the steps of: at an originating media gateway controller, receiving IAM from an originating PSTN and reserving the call related bearer information at an originating media gateway; at the originating media gateway controller, conducting the number translation of the IAM, finding the corresponding terminating media gateway controller and transmitting the IAM to the terminating media gateway controller; at the terminating media gateway controller, receiving the IAM, conducting the number translation of the call receiving number, determining the trunk line at the same time as determining the terminating media gateway and the terminating PSTN, and notifying the terminating media gateway of the reservation of the trunk line; at the terminating media gateway controller, setting up COT check in the IAM and transmitting to the terminating PSTN the IAM with the COT check set-up; at the terminating media gateway controller, including in APM message the information regarding the terminating media gateway and the bearer information and transmitting the APM message to the originating media gateway controller; at the originating media gateway controller, transmitting a request for the bearer set-up to the originating media gateway together with the information included in the APM message; at the originating media gateway, conducting the bearer connection set-up by transmitting the bearer set-up request message to the terminating media gateway and notify the originating media gateway controller of the result of the bearer connection set-up; at the terminating media gateway, confirming whether the bearer connection set-up has been completed and notifying the terminating media gateway controller of the confirmation result; and, at the terminating media gateway controller, if the bearer connection set-up has been completed, including in the COT message the information that the COT check has been completed successfully and transmitting the COT message to the terminating PSTN.

Alternatively, in order to achieve the above objects, the call control method between a packet network and PSTNs in the next generation network according to still another preferred embodiment of the present invention comprises the steps of: at an originating media gateway controller, receiving IAM from an originating PSTN and reserving the call related bearer information at an originating media gateway; at the originating media gateway controller, conducting the number translation of the IAM, finding the corresponding terminating media gateway controller and transmitting INVITE message including the bearer information of the originating media gateway to the terminating media gateway controller; at the terminating media gateway controller, receiving the INVITE message, transmitting a response to the INVITE message to the originating media gateway controller and, at the same time, conducting the number translation of the call receiving number, determining the trunk line at the same time as determining the terminating media gateway and the terminating PSTN, and notifying the terminating media gateway of the reservation of the trunk line; at the terminating media gateway controller, setting up COT check in the IAM and transmitting to the terminating PSTN the IAM with the COT check set-up; at the terminating media gateway, receiving the bearer set-up request from the terminating media gateway controller together with the bearer information of the originating side and conducting the bearer connection to the originating media gateway; at the originating media gateway, notifying the orginating media gateway controller that the bearer set-up has been completed; and, at the terminating media gateway controller, receiving notice whether the bearer setup has been completed from the terminating media gateway, including in the COT message the information as to whether the COT check has been completed and transmitting the COT message to the terminating PSTN.

Preferably, the step of sending the IAM with the COT check setup comprises: at the terminating media gateway controller, setting up Continuity Check Indicator (CCI) code of Nature of Connection Indicators (NC) within the IAM received from the originating media gateway controller as 'Continuity Check Performed on a Previous Circuit'; at the terminating media gateway controller, transmitting the IAM with the COT check set-up to the terminating PSTN through a terminating signalling gateway, and, at the terminating PSTN, recognizing that the COT check is conducted and waiting for the COT check to be terminated without seizing the terminating subscriber.

Preferably, the step of transmitting the COT message comprises, at the terminating media gateway controller, if the bearer connection set-up has been completed, setting the CI code of Continuity Indicators (CI) parameter within the COT message as 'Continuity Check Successful,' or if the bearer connection set-up fails, setting the CI code as 'Continuity Check Failed,' and transmitting the COT message to the termination PSTN.

Alternatively, in order to achieve the above objects, the call control method between a packet network and PSTNs in the next generation network according to still another preferred embodiment of the present invention comprises the steps of: at a media gateway controller, receiving the hook-off of a calling subscriber's terminal and receipt digits from an originating access gateway and reserving the call related bearer information at the originating access gateway; at the media gateway controller, conducting the number translation of the receipt digits, determining the trunk line at the same time as determining the terminating PSTN and the terminating trunk gateway, and noting the terminating trunk gateway of the reservation of the trunk line; at the media gateway controller, setting up COT check in the IAM and transmitting to the terminating PSTN the IAM with the COT check set-up; at the media gateway controller, sending a request for the bearer connection set-up to the terminating trunk gateway together with the bearer information of the originating side received from the originating access gateway; at the terminating trunk gateway, receiving the bearer set-up request from the media gateway controller together with the bearer information of the originating side and conducting the bearer connection to the originating access gateway; at the originating media gateway, notify the media gateway controller that the bearer set-up has been completed; and, at the media gateway controller, receiving notice whether the bearer set-up has been completed from the terminating trunk gateway including in the COT message the information as to whether the COT check has been completed and transmitting the COT message to the terminating PSTN.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention as illustrated in the accompanying drawings. As described below, the present invention, for the inter-operation between a packet network and PSTNs in the next generation network, conducts the virtual COT check during the ISUP call processing to ensure the bearer set-up completion in the packet network and to prevent the dual seizure of the trunk in the packet network.

In other words, according to the present invention, at the time when a terminating media gateway controller receives IAM from an originating media gateway controller, the trunk is seized and the IAM is transmitted to terminating PSTN. Here, the CCI code of NCI parameter within the IAM is set as '10' (i.e., 'Continuity Check Performed on a Previous Circuit') and then the IAM is transmitted to the terminating PSTN. The CCI code is set as 'Continuity Check Performed on a Previous Circuit' to indicate that the COT check (i.e., the bearer connection test) is being performed in a certain point among the previous circuits. Thus, this commends that a ring should not be given to the end subscriber until the COT check success message arrives.

Figure 4:
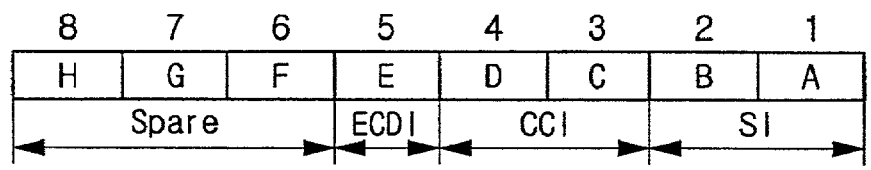
FIG. 4 illustrates the format of Nature of Connection Indicators NCI) parameter within IAM of FIG. 3.

The format of the NCI parameter of IAM is as illustrated in FIG. 4, comprising Satellite Indicator (SI) code, CCI code and Echo Control Device Indicator (ECEDI), etc.

If 'BA' bits of SI code are '00', it means that there is no satellite circuit in the connection. If 'BA' bits are '01', it means that there is one satellite circuit. If 'BA' bits are '10', it means that there are two satellite circuits. If 'BA' bits are '11', this indicates 'Spare.'

If 'DC' bits of CCI code are '00', it means that the Continuity Check has not been requested. '01' means 'Continuity Check Required on This Circuit.' '10' means 'Continuity Check Performed on a Previous Circuit.' '11' means Spare.

If 'E' bit of ECDI code is '0', it means that Outgoing Echo Control Device is not included. '1' means that Outgoing Echo Control Device is included.

The present invention conducts the virtual COT check rather than actually performing the COT check. In other words, even though the call processing is conducted from the originating PSTN transmitting IAM to the final terminating PSTN, the call receipt request is not yet made to the terminating subscriber.

Thereafter, when the bearer connection set-up is completed, CI code of Continuity Indicators (CI) parameter within the COT message is set as '1' meaning 'Continuity Check Successful' and the COT message is transmitted to the terminating PSTN. Then, the terminating PSTN seizes the terminating subscriber and sends a ring so that the normal call processing may be performed.

Figure 5:
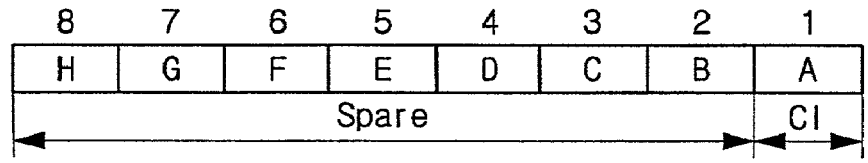
FIG. 5 illustrates the format of a COT message of FIG. 3.

As illustrated in FIG. 5, COT message comprises the message type and CI parameter. The CI parameter includes CI code.

If 'A' bit of CI code is '0', it means 'Continuity Check Failed.' '1' means 'Continuity Check Successful.'

Figure 1:
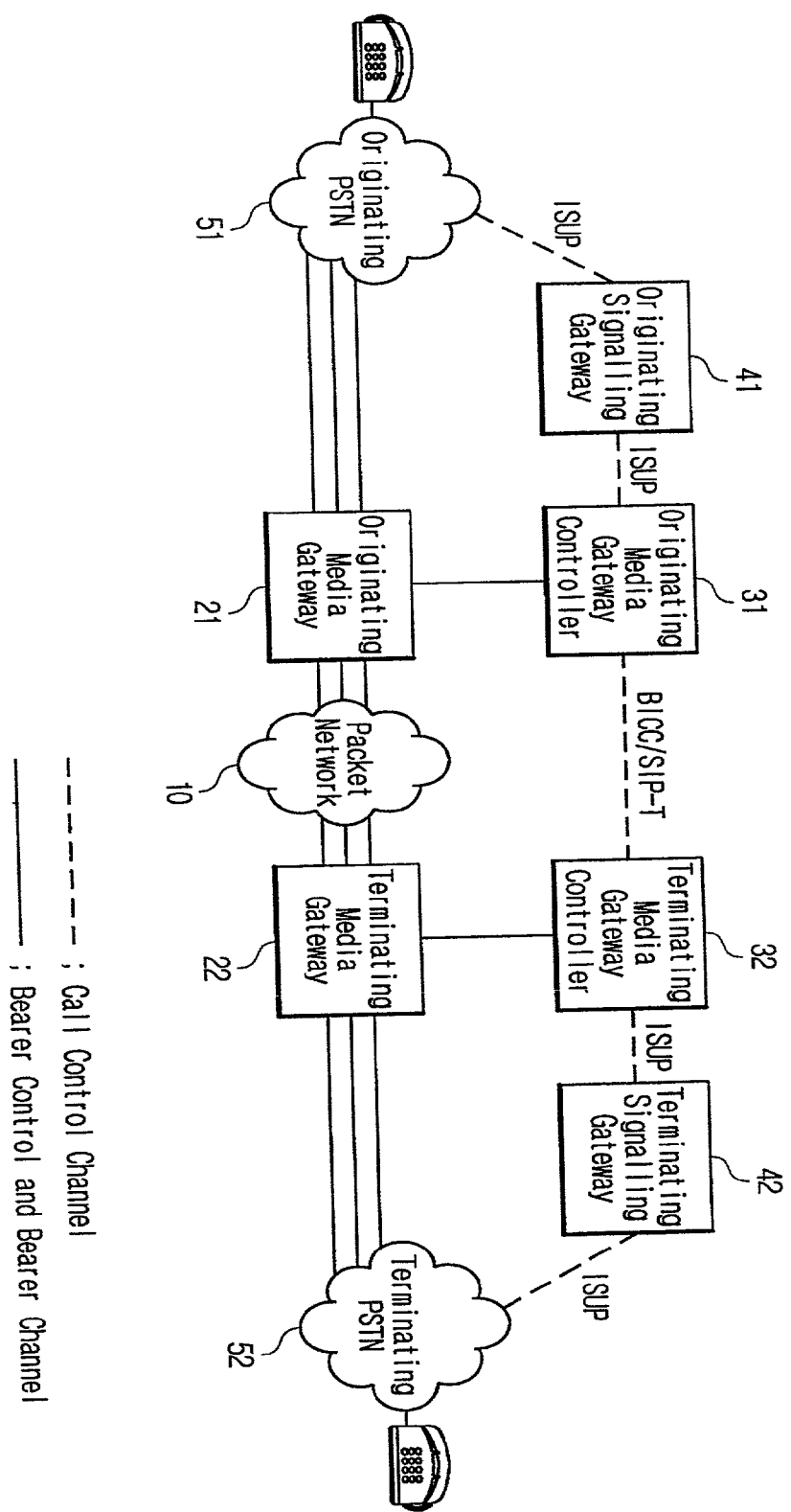
FIG. 1 illustrates the structure of the next generation network related to the present invention.
Figure 2:
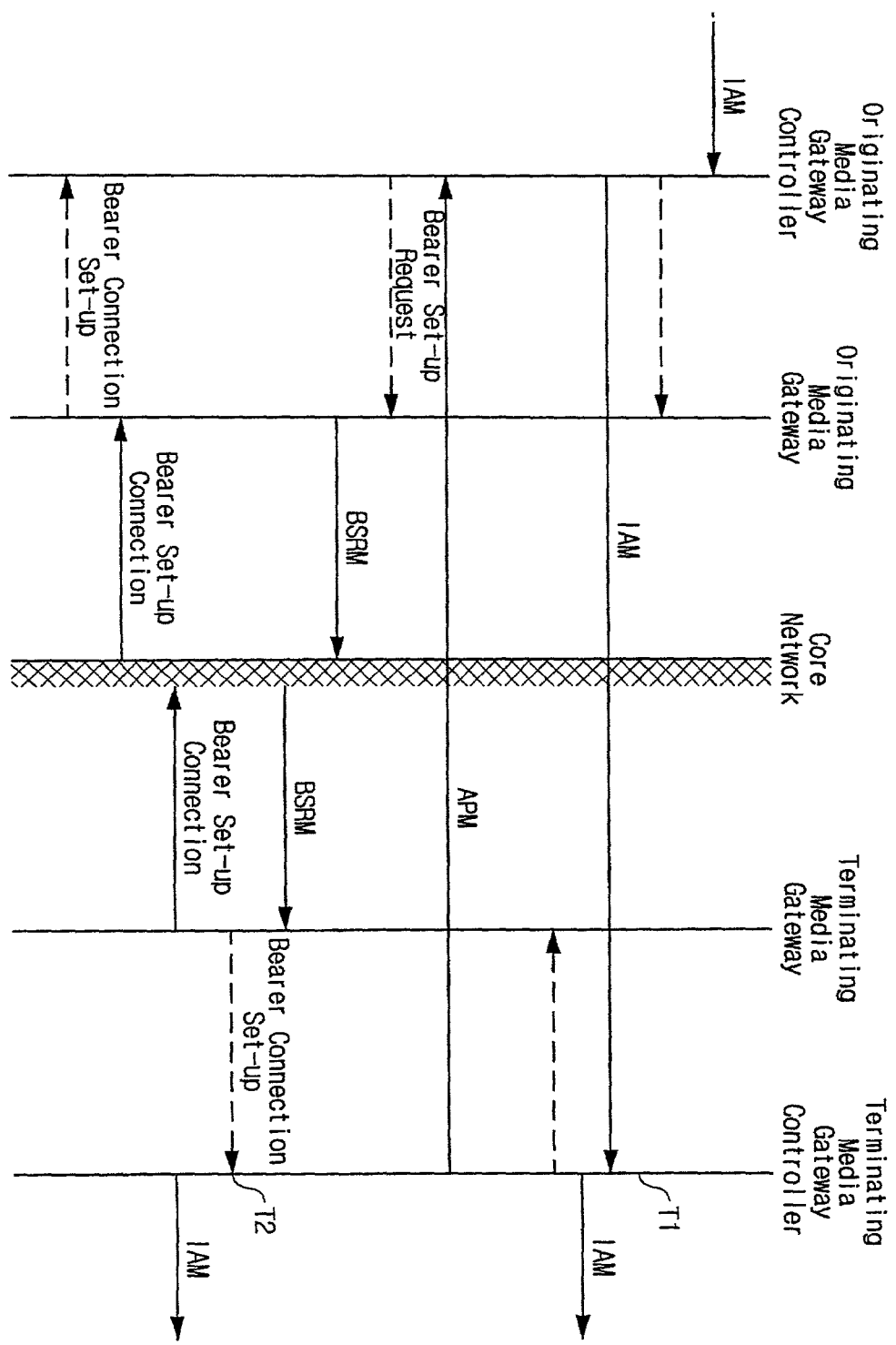
FIG. 2 illustrates a call control method between a packet network and PSTNs shown in FIG. 1 in the related art.
Figure 3:
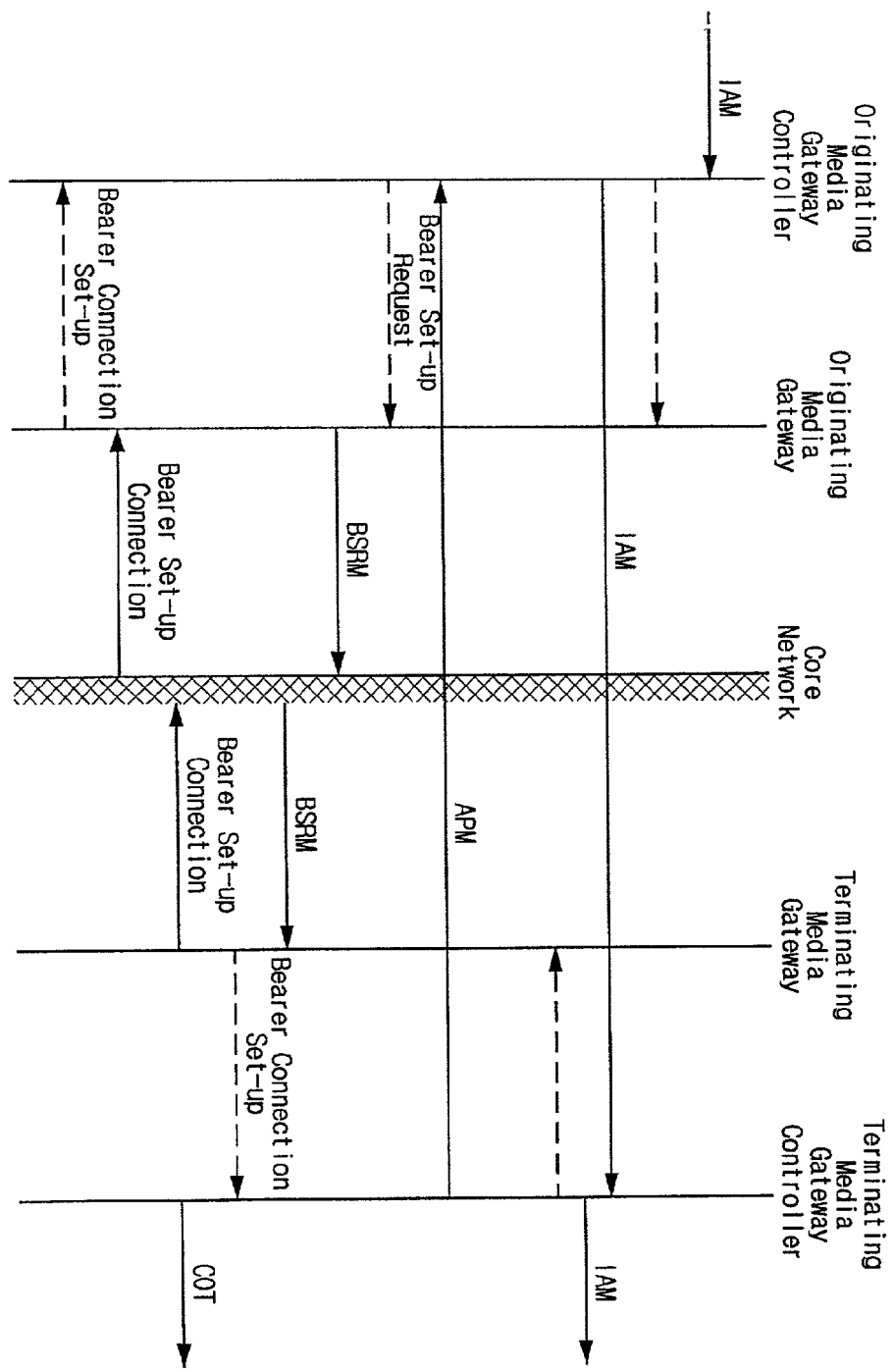
FIG. 3 illustrates a call control method between a packet network and PSTNs in the next generation network according to a preferred embodiment of the present invention.

The call control method between a packet network and PSTNs in the next generation network according to a preferred embodiment of the present invention is described as follows with reference to FIG. 3, in a case that the protocol between media gateway controllers is BICC.

First, an originating media gateway controller receives IAM from an originating PSTN through an originating signalling gateway and reserves the call related bearer information at an originating media gateway.

Then, the originating media gateway controller conducts the number translation of the IAM received through the originating signalling gateway, searches for and finds the corresponding terminating media gateway controller, and transmits the IAM to the terminating media gateway controller.

Thereafter, the terminating media gateway controller, upon receiving the IAM from the originating media gateway controller, conducts the number translation of the call receiving number, determines the terminating media gateway and the terminating PSTN at the same time as determining the trunk connecting the terminating media gateway and the terminating PSTN, and makes the reservation of the trunk at the terminating media gateway.

Preferably, in order to ensure the bearer connection of the part for which the bearer connection needs to be confirmed (i.e., the packet network part), the terminating media gateway controller sets the COT check within the IAM received from the originating media gateway controller. Thus, it becomes as if the COT check were performed in the packet network part or in the previous part. Then, the IAM with the COT check set-up is transmitted to the terminating PSTN through the terminating signalling gateway.

In other words, the terminating media gateway controller sets CCI code of NCI parameter within the IAM received from the originating media gateway controller as '10' meaning 'Continuity Check Performed on a Previous Circuit' and transmits the IAM with such COT check to the terminating PSTN through the terminating signalling gateway. Thus, the terminating PSTN recognizes that the COT check is conducted and waits for the COT check to be finished without seizing the terminating subscriber.

Thereafter, the terminating media gateway controller includes in APM message the information regarding the terminating media gateway and the bearer and transmits the APM message to the originating media gateway controller.

Then, the originating media gateway controller sends a bearer setup request to the originating media gateway together with the information in the APM message received from the terminating media gateway controller.

Thereupon, the originating media gateway conducts the bearer connection set-up by sending Bearer Set-up Request Message (BSRM) to the terminating media gateway and notifies the originating media gateway controller whether the bearer set-up has been completed or not. Also, the terminating media gateway confirms whether the bearer connection set-up has been completed. If the bearer connection set-up has been completed, the terminating media gateway notifies the terminating media gateway controller of the confirmation result.

Then, the terminating media gateway controller includes in the COT message the information indicating that the COT check has been successfully completed in a previous circuit and transmits the COT message to the terminating PSTN through the terminating signalling gateway.

In other words, the terminating media gateway controller sets the CI code of CI parameter within the COT message as '1' meaning 'Continuity Check Successful' and transmits the COT message to the terminating PSTN through the terminating signalling gateway. Thus, the terminating PSTN recognizes that the COT check has been successfully finished, seizes the terminating subscriber and sends a ring.

Thereafter, the regular call processing operations are conducted in the same manner as in the ordinary ISUP call processing.

On the other hand, if the bearer connection set-up fails, the terminating media gateway notifies the terminating media gateway controller of the bearer connection set-up failure.

Then, the terminating media gateway controller includes in the COT message the information indicating that the COT check has not been successful in a previous circuit and transmits the COT message to the terminating PSTN through the terminating signalling gateway.

In other words, the terminating media gateway controller sets the CI code of CI parameter in the COT message as '0' meaning 'Continuity Check Failed' and transmits the COT message to the terminating PSTN through the terminating signalling gateway. Thus, the call failure process is conducted.

Figure 6:
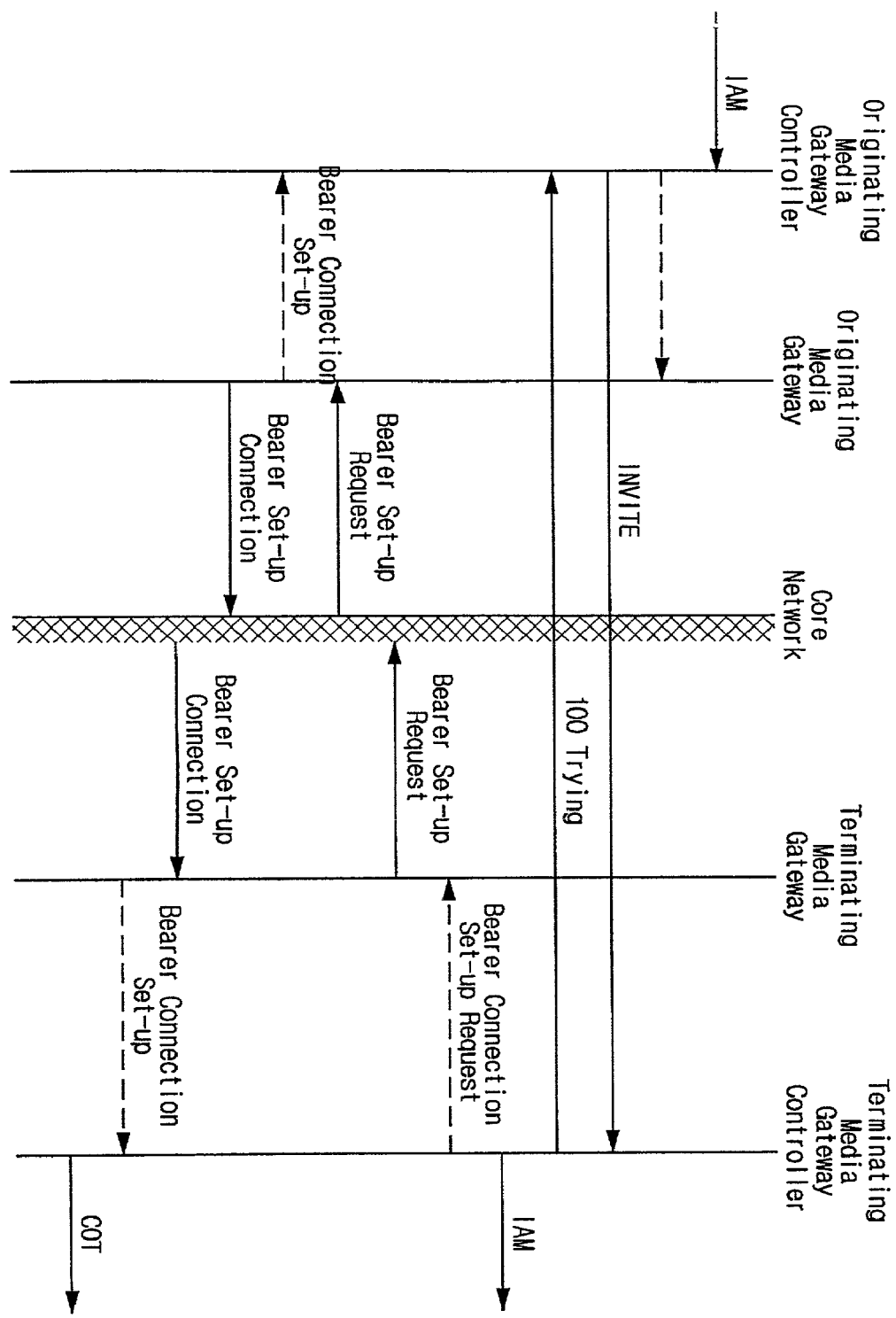
FIG. 6 illustrates a call control method according to the present invention in a case where the protocol between media gateway controllers is SIP-T.

If the protocol between the media gateway controllers is SIP-T, the call control method according to the present invention is as follows, as illustrated in FIG. 6.

First, an originating media gateway controller receives IAM from an originating PSTN through an originating signalling gateway and reserves the call related bearer information at an originating media gateway.

Then, the originating media gateway controller conducts the number translation of the IAM received through the originating signalling gateway, searches for and finds the corresponding terminating media gateway controller, and transmits a call request message, INVITE message, including the originating media gateway's bearer information to the terminating media gateway controller.

Then, the terminating media gateway controllers receives the INVITE message from the originating media gateway controller, transmits 100 Trying message to the originating media gateway controller in response, and at the same time, conducts the number translation of the call receiving number, determines the terminating media gateway, terminating PSTN and the trunk connecting the terminating media gateway and the terminating PSTN.

Preferably, in order to ensure the bearer connection of the packet network part, the terminating media gateway controller sets the COT check within the IAM received from the originating media gateway controller. Thus, it becomes as if the COT check were performed in the packet network part or in the previous part. Then, the IAM with the COT check set-up is transmitted to the terminating PSTN through the terminating signalling gateway.

In other words, the terminating media gateway controller sets CCI code of NCI parameter within the IAM as '10' meaning 'Continuity Check Performed on a Previous Circuit' and transmits the IAM with such COT check to the terminating PSTN through the terminating signalling gateway. Thus, the terminating PSTN recognizes that the COT check is conducted and waits for the COT check to be finished without seizing the terminating subscriber.

Thereafter, the terminating media gateway controller sends a bearer connection set-up request to the terminating media gateway together with the originating side's bearer information received from the originating side. Then, the terminating media gateway commences the bearer connection to the originating media gateway. The originating media gateway notifies the originating media gateway controller that the bearer connection has been completed.

Then, the terminating media gateway notifies the terminating media gateway controller whether the bearer set-up to the originating media gateway has been completed or not. The terminating media gateway controller includes in the COT message the information that the COT check has been successfully completed in a previous circuit and transmits the COT message to the terminating PSTN through the terminating signalling gateway.

In other words, the terminating media gateway controller sets the CI code of CI parameter within the COT message as '1' meaning 'Continuity Check Successful' and transmits the COT message to the terminating PSTN through the terminating signalling gateway. Thus, the terminating PSTN recognizes that the COT check has been successfully finished, seizes the terminating subscriber and sends a ring.

Thereafter, the regular call processing operations are conducted in the same manner as in the ordinary ISUP call processing.

On the other hand, if the bearer connection set-up fails in the packet network part, the terminating media gateway notifies the terminating media gateway controller of the bearer connection set-up failure.

Then, the terminating media gateway controller includes in the COT message the information indicating that the COT check has not been successful in a previous circuit and transmits the COT message to the terminating PSTN through the terminating signalling gateway.

In other words, the terminating media gateway controller sets the CI code of CI parameter in the COT message as '0' meaning 'Continuity Check Failed' and transmits the COT message to the terminating PSTN through the terminating signalling gateway. Thus, the call failure process is conducted.

Figure 7:
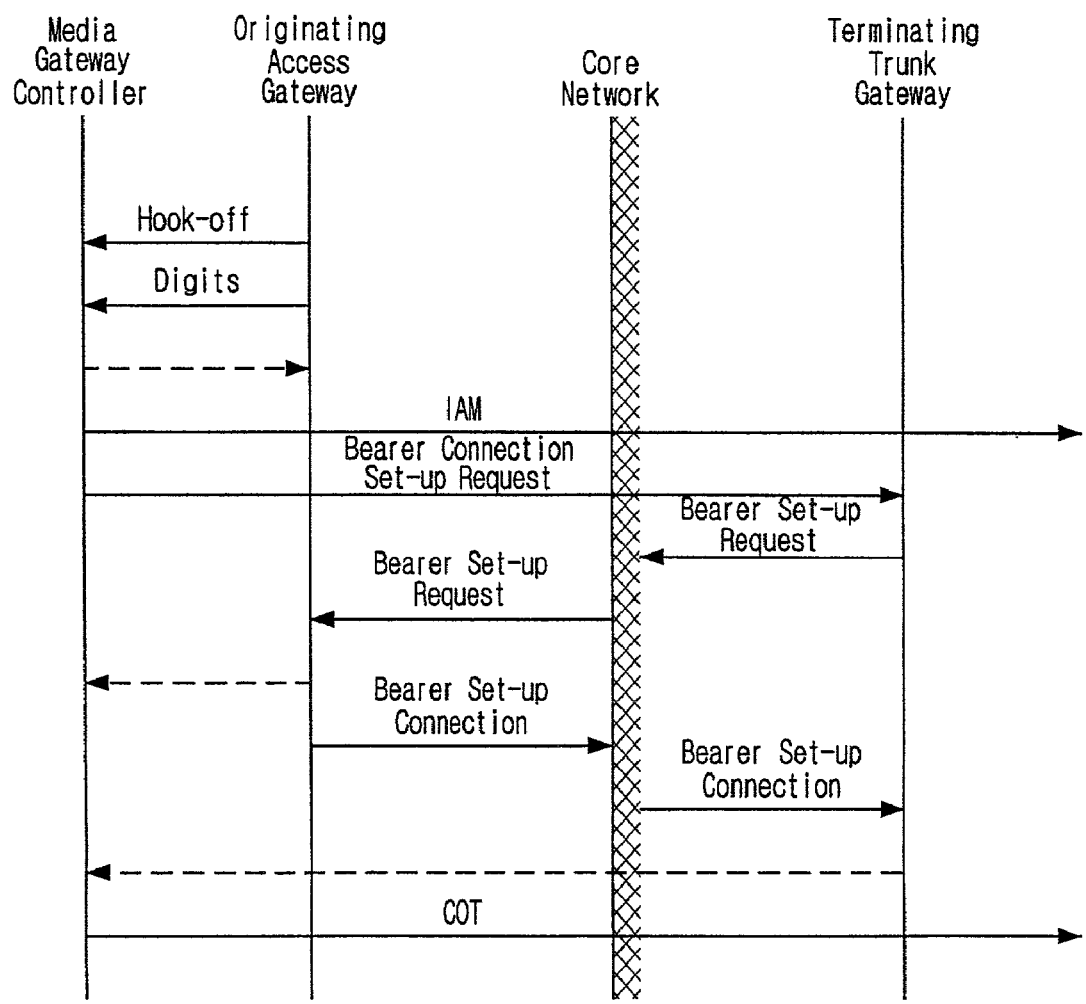
FIG. 7 illustrates a call control method in an intra media gateway controller according to another preferred embodiment of the present invention.

The call control method in an intra media gateway controller according to another preferred embodiment of the present is described in the following as illustrated in FIG. 7.

First, an originating access gateway transmits the hook-off of a calling subscriber's terminal to a media gateway controller and transmits the terminating digits to the media gateway controller.

The media gateway controller reserves the call related bearer information at an originating access gateway, conducts the number translation of the digits received from the originating access gateway, determines the terminating PSTN and the terminating trunk gateway, at the same time as determining the trunk connecting the terminating PSTN and the terminating trunk gateway.

Preferably, in order to ensure the bearer connection of the packet network part, the media gateway controller sets the COT check within the IAM as if the COT check were performed in the packet network part or in the previous part. Then, the IAM with the COT check set-up is transmitted to the terminating PSTN.

In other words, the media gateway controller sets CCI code of NCI parameter within the IAM as '10' meaning 'Continuity Check Performed on a Previous Circuit' and transmits the IAM with such COT check to the terminating PSTN. Thus, the terminating PSTN recognizes that the COT check is conducted and waits for the COT check to be finished without seizing the terminating subscriber.

Thereafter, the media gateway controller sends a bearer connection set-up request to the terminating trunk gateway together with the originating side's bearer information received from the originating access gateway. Then, the terminating trunk gateway commences the bearer connection to the originating access gateway. The originating access gateway notifies the media gateway controller that the bearer connection has been completed.

Then, the terminating trunk gateway notifies the media gateway controller whether the bearer set-up to the originating access gateway has been completed or not. The media gateway controller includes in the COT message the information that the COT check has been successfully completed in a previous circuit and transmits the COT message to the terminating PSTN.

In other words, the media gateway controller sets the CI code of CI parameter within the COT message as '1' meaning 'Continuity Check Successful' and transmits the COT message to the terminating PSTN. Thus, the terminating PSTN recognizes that the COT check has been successfully finished, seizes the terminating subscriber and sends a ring.

Thereafter, the regular call processing operations are conducted in the same manner as in the normal ISUP call processing.

On the other hand, if the bearer connection set-up fails in the packet network part, the terminating trunk gateway notifies the media gateway controller of the bearer connection set-up failure.

Then, the media gateway controller includes in the COT message the information indicating that the COT check has not been successful in a previous circuit and transmits the COT message to the terminating PSTN.

In other words, the media gateway controller sets the CI code of CI parameter in the COT message as '0' meaning 'Continuity Check Failed' and transmits the COT message to the terminating PSTN. Thus, the call failure process is conducted.

As illustrated above, in the inter-operation of a packet network and PSTNs in the next generation network according to the present invention, as the COT check is conducted using the COT message among ISUP messages, the bearer set-up completion in the packet network may be ensured by seizing a terminating subscriber at the time when it is confirmed that the packet network's bearer set-up has been completed. Also, by reserving the trunk between the packet network and the PSTN at the same time as sending the IAM to seize the trunk, it is possible to prevent the double seizure of the trunk between the packet network and the PSTN.

What is claimed is:

1. A call control method between a packet network and Public Switched Telephone Networks (PSTNs) in a next generation network; the method comprising:

for the inter-operation between the packet network and the PSTN, setting up a virtual continuity (COT) check in an ISDN User Part ISUP) call processing and transmitting an Initial Address Message (IAM);

receiving the IAM, conducting the number translation of the call receiving number, determining a terminating media gateway and a terminating PSTN at the same time as determining a trunk and notifying the terminating media gateway of the reservation of the trunk;

transmitting the IAM with the COT check set-up to the terminating PSTN, after setting up the COT check in the IAM; and conducting the bearer connection set-up based upon the bearer set-up request of the packet network, including in COT message whether the COT check has been completed depending on the result of the bearer connection set-up and transmitting the COT message.

2. The method of claim 1, wherein the IAM includes Nature of Connection Indicators (NCI) parameter and the NCI parameter comprises:
- Satellite Indicator (SI) code indicating the existence of the number of satellite circuits in the connection;
- Continuity Check Indicator (CCI) code indicating the existence of the COT check request or the COT check performance; and
- Echo Control Device Indicator (ECDI) code indicating whether Outgoing Echo Control Device is included or not.

3. The of claim 1, wherein the COT message includes a message type parameter and Continuity Indicators (CI) parameter and the CI parameter comprises CI code indicating whether the COT check has been successful or not.

4. The method of claim 1, wherein the transmitting the IAM comprises:
- at an originating media gateway controller, receiving the IAM from an originating PSTN and reserving the call related bearer information at an originating media gateway; and
- at the originating media gateway controller, conducting the number translation of the IAM, searching for a terminating media gateway controller and transmitting the IAM to the terminating media gateway controller, wherein the terminating media gateway controller performs the receiving the IAM, conducting the number translation of the call receiving number, determining a terminating media gateway and a terminating PSTN at the same time as determining a trunk and notifying the terminating media gateway of the reservation of the trunk; and the transmitting the IAM with the COT check set-up to the terminating PSTN.

5. The method of claim 4, wherein the transmitting the IAM with the COT check set-up comprises:
- at the terminating media gateway controller, setting Continuity Check Indicator (CCI) code of Nature of Connection Indicators (NCI) within the IAM received from the originating media gateway controller as 'Continuity Check Performed on a Previous Circuit';
- at the terminating media gateway controller, transmitting the IAM with the COT check set-up to the terminating PSTN through a terminating signalling gateway; and
- at the terminating PSTN, recognizing that the COT check is conducted and waiting for the COT check to be finished without seizing the terminating subscriber.

6. The method of claim 1, wherein the transmitting the COT message comprises:
- at the terminating media gateway controller, including in Application Transport Mechanism (APM) message the information regarding the terminating media gateway and the bearer information and transmitting the APM message to the originating media gateway controller;
- at the originating media gateway controller, sending a request for the bearer set-up to the originating media gateway together with the information included in the APM message;
- at the originating media gateway, conducting the bearer connection set-up by transmitting the bearer set-up request message to the terminating media gateway and then notifying the originating media gateway controller of the result of the bearer connection set-up;
- at the terminating media gateway, confirming whether the bearer connection set-up has been completed and notifying the terminating media gateway controller of the confirmation result; and
- at the terminating media gateway controller, if the bearer connection set-up is completed, including in the COT message the information that the COT check has been successfully completed and transmitting the COT message to the terminating PSTN.

7. The method of claim 6, wherein the transmitting the COT message further comprises, at the terminating media gateway controller, if the bearer connection set-up fails, setting the CI code of Continuity Indicators (CI) parameter within the COT message as 'Continuity Check Failed' and transmitting the COT message to the termination PSTN.

8. The method of claim 6, wherein the transmitting the COT message comprises:
- at the terminating media gateway controller, if the bearer connection set-up has been completed, setting the CI code of Continuity Indicators (CI) parameter within the COT message as 'Continuity Check Successful';
- at the terminating media gateway controller, transmitting the COT message to the terminating PSTN through the terminating signalling gateway; and
- at the terminating PSTN, recognizing that the COT check has been completed successfully and conducting the regular call processing by seizing the terminating subscriber and sending a ring.

9. A call control method between a packet network and Public Switched Telephone Networks (PSTNs) in a next generation network; the method comprising:
- at an originating media gateway controller, receiving an IAM from an originating PSTN and reserving the call related bearer information at an originating media gateway;
- at the originating media gateway controller, conducting the number translation of the IAM, finding the corresponding terminating media gateway controller and transmitting the IAM to the terminating media gateway controller;
- at the terminating media gateway controller, receiving the IAM, conducting the number translation of the call receiving number, determining a trunk at the same time as determining a terminating media gateway and a terminating PSTN, and notifying the terminating media gateway of the reservation of the trunk;
- at the terminating media gateway controller, setting up COT check in the IAM and transmitting to the terminating PSTN the IAM with the COT check set-up;
- at the terminating media gateway controller, including in the Application Transport Mechanism (APM) message the information regarding the terminating media gateway and the bearer information and transmitting the APM message to the originating media gateway controller;
- at the originating media gateway controller, transmitting a request for the bearer set-up to the originating media gateway together with the information included in the APM message;
- at the originating media gateway, conducting the bearer connection set-up by transmitting the bearer set-up request message to the terminating media gateway and notifying the originating media gateway controller of the result of the bearer connection set-up;
- at the terminating media gateway, confirming whether the bearer connection set-up has been completed and notifying the terminating media gateway controller of the confirmation result; and
- at the terminating media gateway controller, if the bearer connection set-up has been completed, including in the COT message the information that the COT check has been completed successfully and transmitting the COT message to the terminating PSTN.

10. A call control method between a packet network and Public Switched Telephone Networks (PSTNs) in a next generation network; the method comprising:

at an originating media gateway controller, receiving an IAM from an originating PSTN and reserving the call related bearer information at an originating media gateway;

at the originating media gateway controller, conducting the number translation of the IAM, finding the corresponding terminating media gateway controller and transmitting an INVITE message including the bearer information of the originating media gateway to the terminating media gateway controller;

at the terminating media gateway controller, receiving the INVITE message, transmitting a response to the INVITE message to the originating media gateway controller and, at the same time, conducting the number translation of the call receiving number, determining a trunk at the same time as determining a terminating media gateway and a terminating PSTN, and notifying the terminating media gateway of the reservation of the trunk;

at the terminating media gateway controller, setting up the COT check in the IAM and transmitting to the terminating PSTN the IAM with the COT check set-up;

at the terminating media gateway, receiving the bearer set-up request from the terminating media gateway controller together with the bearer information of the originating side and conducting the bearer connection to the originating media gateway;

at the originating media gateway, notifying the originating media gateway controller that the bearer set-up has been completed; and at the terminating media gateway controller, receiving notice whether the bearer set-up has been completed from the terminating media gateway, including in the COT message the information as to whether the COT check has been completed and transmitting the COT message to the terminating PSTN.

11. The method of claim 10, wherein the sending the IAM with the COT check set-up comprises:

at the terminating media gateway controller, setting up the Continuity Check Indicator (CCI) code of Nature of Connection Indicators (NCI) within the IAM received from the originating media gateway controller as 'Continuity Check Performed on a Previous Circuit';

at the terminating media gateway controller, transmitting the IAM with the COT check set-up to the terminating PSTN through a terminating signaling gateway; and at the terminating PSTN, recognizing that the COT check is conducted and waiting for the COT check to be finished without seizing the terminating subscriber.

12. The method of claim 10, wherein the transmitting the COT message comprises, at the terminating media gateway controller, if the bearer connection set-up has been completed, setting the CI code of Continuity Indicators (CI) parameter within the COT message as 'Continuity Check Successful,' or if the bearer connection set-up fails, setting the CI code as 'Continuity Check Failed,' and transmitting the COT message to the termination PSTN.

13. A call control method between a packet network and Public Switched Telephone Networks (PSTNs) in a next generation network; the method comprising the:

at a media gateway controller, receiving the hook-off of a calling subscriber's terminal and receipt digits from an originating access gateway and reserving the call related bearer information at the originating access gateway;

at the media gateway controller, conducting the number translation of the receipt digits, determining a trunk at the same time as determining a terminating PSTN and a terminating trunk gateway, and notifying the terminating trunk gateway of the reservation of the trunk;

at the media gateway controller, setting up the COT check in the IAM and transmitting to the terminating PSTN the IAM with the COT check set-up;

at the media gateway controller, sending a request for the bearer connection set-up to the terminating trunk gateway together with the bearer information of the originating side received from the originating access gateway;

at the terminating trunk gateway, receiving the bearer set-up request from the media gateway controller together with the bearer information of the originating side and conducting the bearer connection to the originating access gateway;

at the originating media gateway, notifying the media gateway controller that the bearer set-up has been completed; and at the media gateway controller, receiving notice whether the bearer set-up has been completed from the terminating trunk gateway, including in the COT message the information as to whether the COT check has been completed and transmitting the COT message to the terminating PSTN.

* * * * *